United States Patent [19]
Fujita et al.

[11] 4,263,495
[45] Apr. 21, 1981

[54] METHOD OF SPLICING OPTICAL FIBERS BY $CO_2$-LASER

[75] Inventors: Hiroyuki Fujita; Yasuzi Suzaki; Atsushi Tachibana, all of Yokohama, Japan

[73] Assignee: Hitachi, Ltd., Japan

[21] Appl. No.: 924,757

[22] Filed: Jul. 14, 1978

Related U.S. Application Data
[63] Continuation of Ser. No. 721,488, Sep. 8, 1976, abandoned.

[30] Foreign Application Priority Data
Sep. 10, 1975 [JP] Japan .................................. 50-10934

[51] Int. Cl.³ ............................................. B23K 27/00
[52] U.S. Cl. ...................... 219/121 LD; 219/121 LC; 219/121 LY; 219/121 LZ
[58] Field of Search ..... 219/121 L, 121 LM, 121 EB, 219/121 EM, 121 LC, 121 LZ, 121 LD, 121 LY, 121 EC, 121 ED; 350/96.15, 96.2, 96.21; 65/DIG. 7; 156/158

[56] References Cited
U.S. PATENT DOCUMENTS
| | | | |
|---|---|---|---|
| 3,517,159 | 6/1970 | Milochevitch | 219/121 L |
| 3,825,319 | 7/1974 | Cook et al. | 65/DIG. 7 |
| 3,928,102 | 12/1975 | Rowe et al. | 65/DIG. 7 |
| 3,960,531 | 6/1976 | Kohanzadeh et al. | 219/58 |

OTHER PUBLICATIONS
T.R. Kyle, *Applied Optics*, "Glass Fiber Hermetic Seals Using a $CO_2$ Laser", vol. 14, No. 6, pp. 1342–1344, Jun. 1975.

*Primary Examiner*—C. L. Albritton
*Attorney, Agent, or Firm*—Craig and Antonelli

[57] ABSTRACT

A method of permanently joining or splicing optical fibers containing a fused silica or fused quartz fiber as a main component and having a high softening temperature by using a $CO_2$-laser with $TEM_{oo}$ mode in such a manner that laser power of about 1 watt may be applied to the optical fiber per unit area thereof. Two or more optical fibers are joined together through fusion with the end portions being positioned in opposition to one another, resulting in a joint having a low joint loss and an increased tensile strength.

14 Claims, 14 Drawing Figures

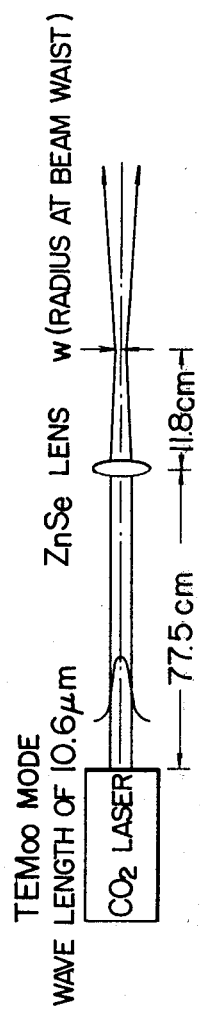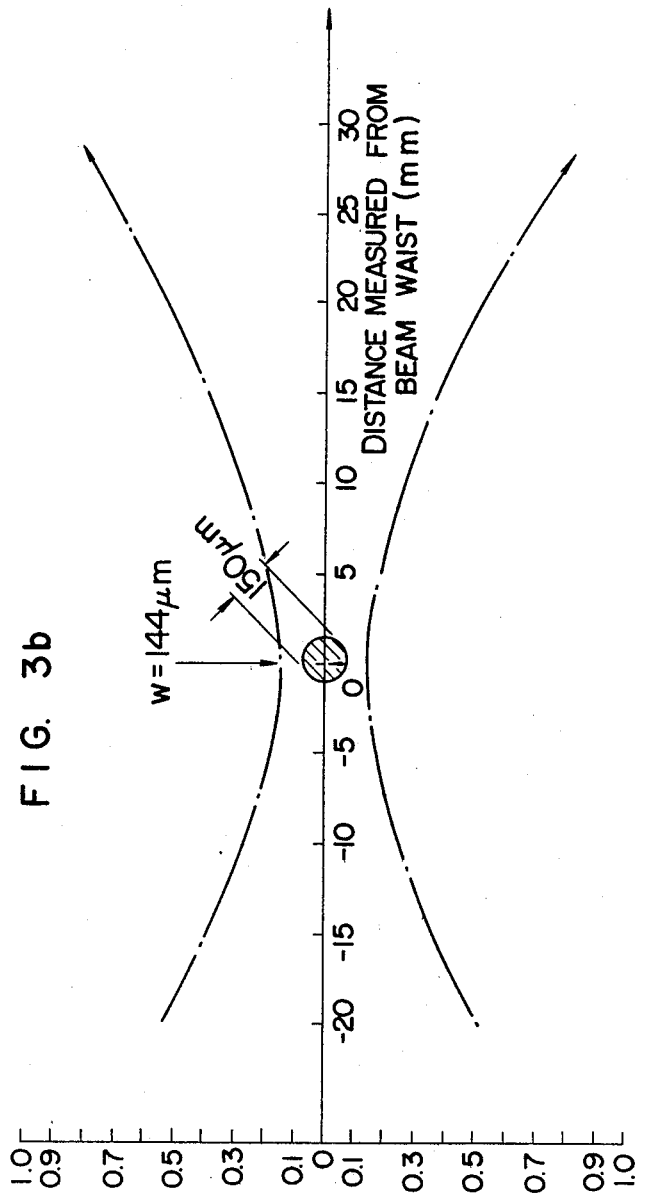

METHOD OF SPLICING OPTICAL FIBERS BY $CO_2$-LASER

This is a Continuation, of application Ser. No. 721,488 filed Sept. 8, 1976 now abandoned.

BACKGROUND OF THE INVENTION

1. Field of the Invention

The present invention relates in general to a method of joining together optical fibers and in particular to a method of joining or splicing fused silica fibers having a relatively high softening temperature by utilizing a $CO_2$-laser.

2. Description of the Prior Art

In recent years, studies on the optical fibers have made a rapid and noticeable progress to such a practical level that the optical fiber can be realized with a low loss in the order of several dB's per kilometer. Communication systems utilizing the optical fiber have entered upon the stage of practical application. Under the circumstances, the optical fiber splicing technique provides a problem which attracts increasingly attention of those skilled in the art. The optical fiber splicing technique may in general be classified into two varieties, one of which resides in forming a releasable joint, while the other method is directed to the formation of a permanent joint. In the case of the latter method, the optical fibers to be joined are aligned so as to directly abut on each other at the end faces thereof by using a sleeve or like means. As an alternative, the optical fibers are joined through fusion or bonded through an appropriate adhesive agent. The method of fusing together the optical fibers has an advantage that the reflexion loss at the formed joint can be reduced as compared with the directly abutting method and besides is advantageous over the bonding method in that the joint having a greater strength can be accomplished. For these reasons, the fusing method is regarded as one of the most effective means for forming the permanent joint of the optical fibers.

In the first attempt for joining together the optical fibers through the fusing method as developed by D. L. Bisbee, the fused joint between the optical fibers having a relatively low softening temperature or point (about 630° C.) has been done by means of a heated nichrome wire. However, this method cannot be applied to the joining or splicing of fused silica or fused quartz fibers of a high softening point which are now employed in most practical applications.

SUMMARY OF THE INVENTION

Therefore, an object of the invention is to provide an optical fiber joining method which has evaded the drawbacks of the hitherto known techniques described above and which is capable of joining optical fibers of fused silica, i.e. the most commonly employed optical fibers with a minimum joint loss and with a high mechanical strength substantially as great as that of the optical fiber itself.

Another object of the invention is to provide a method of joining optical fibers through fusion in which deposition of impurities can be effectively prevented during the fusion and which allows a facilitated control of heat quantity employed in the fusion.

Still another object of the invention is to provide an optical fiber joining method which is characterized by an improved reproductivity and a low joint loss.

The above and other objects, features and advantages of the invention will become more apparent from the following description of preferred embodiments taken in conjunction with the accompanying drawings.

BRIEF DESCRIPTION OF THE DRAWINGS

FIGS. 3a and 3b illustrate the positional relationship between optical fibers to be joined and the laser.

DETAILED DESCRIPTION OF THE PREFERRED EMBODIMENTS

As hereinbefore described, the invention resides in a method of joining optical fibers through fusion by means of $CO_2$ laser, advantages of which are that the amount of heat required for forming the fused joint between the fused silica or fused quartz fibers of a single or multi-mode type having a high softening temperature can be easily controlled and that impurities are effectively excluded from being deposited on the joint portion. Before entering into details of the invention, the principle of method of fusing together the optical fibers by means of $CO_2$ laser will be first described.

Figure 1:
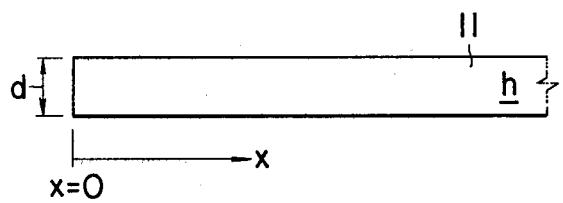
FIG. 1 illustrates a one-dimensional heat conduction model to estimate the laser power required for forming the fused joint of optical fiber.

Estimation of the laser power required for fusing together may be made on the basis of the one-dimensional heat conduction model shown in FIG. 1, in which reference numeral 11 represents an optical fiber.

Since the optical fiber 11 is of a small diameter, the assumption that the heat flux $Q_o$ (cal/sec.cm$^2$) is generated uniformly in the whole end face of the fiber by irradiating a portion of the end face with a laser beam will be approximately valid. The heat conduction equation for the temperature T (°C.) can be written as $$\frac{\partial T}{\partial t} = a \frac{\partial^2 T}{\partial X^2} - \frac{4hT}{\rho C p d} \tag{1}$$

where Cp (cal/g°C.) represents the specific heat of the optical fiber, $\rho$(g/cm$^3$) the density, $\lambda$(cal/sec.cm.°C.) the thermal conductivity, h (cal/sec.cm$^2$.°C.) the heat transfer coefficient and d (cm) the diameter of the fiber. In the above equation, $a = \lambda/\rho Cp$, representing the thermal diffusivity, and t represents the time of laser heating. The letter x represents the longitudinal distance of the fiber from the end face. Assuming that an impulse heat of $\rho Cp$ cal/cm$^3$ is generated at t=0 and x=x'(x' represents an arbitrarily selected distance), the solution of the equation (1) can be determined as Green function G. That is, $$T = G = \frac{1}{2\sqrt{at}} e^{\left(-\frac{(x-x')^2}{4at} + e^{-\frac{(x+x')^2}{4at}}\right)} e^{-\frac{4h}{\rho Cp} t} \quad (2)$$

In this connection, it has been assumed that the ambient temperature of the fiber remains at 0° C., that the fibers temperature is initially 0° C. and that h equal zero at x=0. Since the heat flux Q $(\tau)=Q_o$ is generated at t=$\tau$ and x=0, the equation (2) can be rewritten as follows:

$$G = G_T = \frac{1}{\sqrt{\pi a (t-\tau)}} \exp\left(-\frac{x^2}{4a(t-\tau)} - \frac{4h}{\rho Cpd}(t-\tau)\right) \quad (3)$$

Therefore, the solution of the equation (1) is:

$$T = \frac{a}{\lambda} \int_0^t G_T \cdot Q(\tau) d\tau \quad (4)$$

$$= \frac{aQ_o}{\lambda} \int_0^t \frac{1}{\sqrt{\pi a(t-\tau)}} \exp\left(-\frac{x^2}{4a(t-\tau)} - \frac{4h}{\rho Cpd}(t-\tau)\right) d\tau.$$

The factors to be determined in this conjunction are the laser power and the laser heating time required for the end face of the fiber attaining the softening temperature Ts. By replacing T by Ts and taking x=0, the equation (4) is rewritten as $$Q_o = 2Ts \sqrt{\frac{\lambda h}{d}} \left(erf\left(\sqrt{\frac{4h}{\rho Cpd}} t\right)\right)^{-1} \quad (5)$$

where erf (z) represents the error function, i.e.

$$erf(z) = \frac{2}{\sqrt{\pi}} \cdot \int_o^z e^{-\eta^2} d\eta.$$

Figure 2:
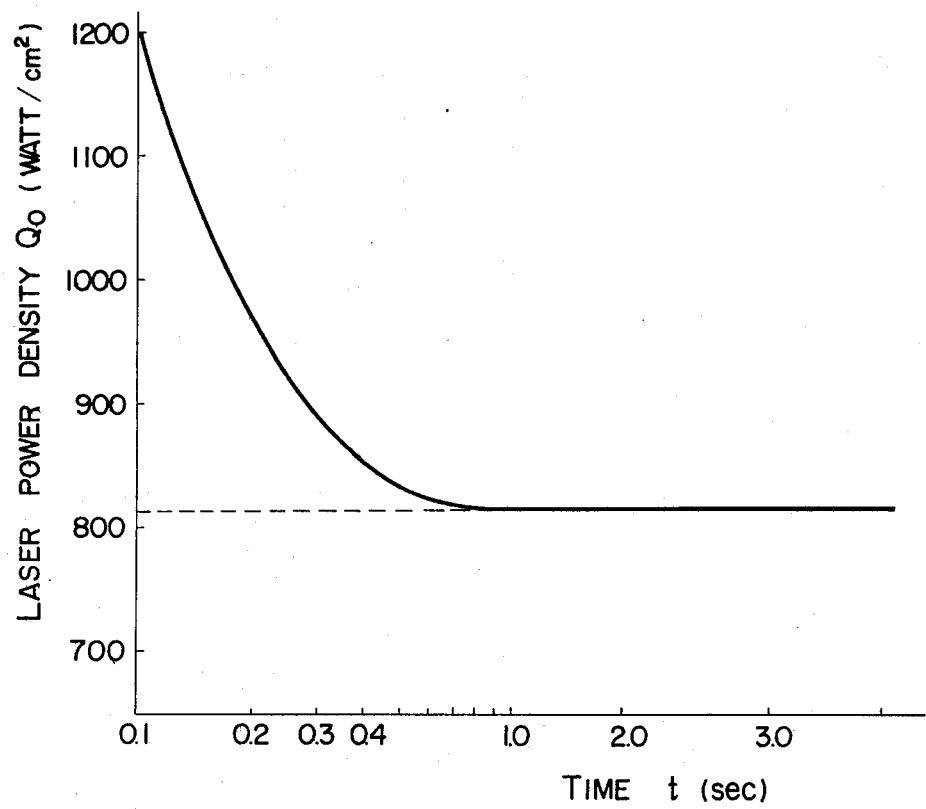
FIG. 2 is a graph illustrating relationship between the laser power or energy per unit area and laser illuminating duration required for the fusion.

FIG. 2 illustrates graphically the equation (5) applied to the fused silica fiber in which Cp=0.25 cal/g°C., $\rho$=2.2 g/cm$^3$, $\lambda$=3.5×10$^{-3}$ cal/sec.cm.°C., h=1×10$^{-2}$ cal/sec.cm$^2$.°C., Ts=2000° C. and d=1.5×10$^{-2}$ cm. Since the fused silica or fused quartz fiber absorbs 10.6 $\mu$m infrared radiation by nearly 100%, $Q_o$ also represents the laser power required for fusing together the fibers. From FIG. 2, it can be seen that the laser power per unit area (laser power density) of at least about 810 watt/cm$^2$ is required for joining the optical fiber through fusion. In order to attain such laser power density, it is necessary to focus the laser beam by using a lens. Since the diameter of optical fiber is usually in the range of 100 $\mu$m to 300 $\mu$m, a laser beam focussed smaller than such range will be ineffective. In other words, the laser beam of a diameter in the order of 400 $\mu$m will be sufficient for fusing together the optical fibers of all diameters. The required laser power will be then $p \approx \pi(2 \times 10^{-2})^2 \times 810 \approx 1.0$ watt This means that all available fused silica fibers can be fused together when a laser of about 2 watt output is used.

In an experiment, fused silica or fused quartz fibers were aligned to each other in the vicinity of a focal point of a lens for focussing the laser beam with the aid of a microscope having a magnifying power of 50, as shown in FIG. 3. In the focal region where laser radiation energy contributes effectively to the heating of the optical fiber, the laser beam has a diameter of about 290 $\mu$m. When the abutting end portions of the optical fibers were irradiated for 1 to 5 seconds by a $CO_2$ laser having output power of 0.5 to 0.8 watts, the optical fiber could be fused together to form an improved joint. The results of this experiment will well coincide with the estimation illustrated in FIG. 2 which shows that the laser power of 0.53 watts is required for heating the regions covering the length of 144 $\mu$m from the end of the respective optical fibers at 2000° C. with the irradiation for 1 to 5 seconds. The splice loss at the joined portion thus formed is lower than 0.5 dB. The distance between the end faces of the aligned optical fibers is determined in dependence upon the linear thermal expansion of the used optical fibers. The linear thermal expansion coefficient of the fused silica fiber is about 6×10$^{-7}$°C.$^{-1}$. Accordingly, when a piece of fused silica fiber is heated up to about 2000° C. over the length of about 300 $\mu$m, the fiber will undergo expansion of 0.36 $\mu$m (=300 $\mu$m×6×10$^{-7}$×2000° C.). When two pieces of fibers are joined, total linear expansion will amount to about 0.72 $\mu$m. It can be thus appreciated that the distance between the ends of the fused silica fibers aligned in opposition to each other has to be selected smaller than about 1 $\mu$m.

In experiments, the fused silica fibers having clear cut end faces could be fused together to form a satisfactory joint even when the end faces was placed in contact. However, in the case of the fibers which have not clear cut end faces, it was necessary to place the end faces in contact and press toward each other during irradiation by means of $CO_2$ laser.

As will be understood from the above description, according to the invention, two optical fibers to be joined together are aligned to each other with the aid of a micro-manipulator or guide member described hereinafter so that the opposing end faces of the optical fiber may be positioned in the vicinity of a focussing lens system for a laser beam, i.e. in the region of the focussed laser beam. The distance between the opposing end faces of the aligned optical fibers is so selected that the end faces will come to contact with each other due to thermal expansion thereof when irradiated with the laser beam. A laser which is capable of producing light energy of wave length absorbed by fused silica fiber at a relatively low output power in the order of 1 to 2 watts such as $CO_2$ laser is employed for fusing together the opposite end portions of the optical fibers by irradiating them along a portion of the peripheral surface or around the whole peripheral surface of the fiber through an optical system. The irradiation is effected by the focussed laser beam with or without an appropriate divergence for a time duration determined from the theoretical analysis described hereinbefore.

Now, an example of carrying out the invention will be described with reference to FIG. 4.

Figure 4:
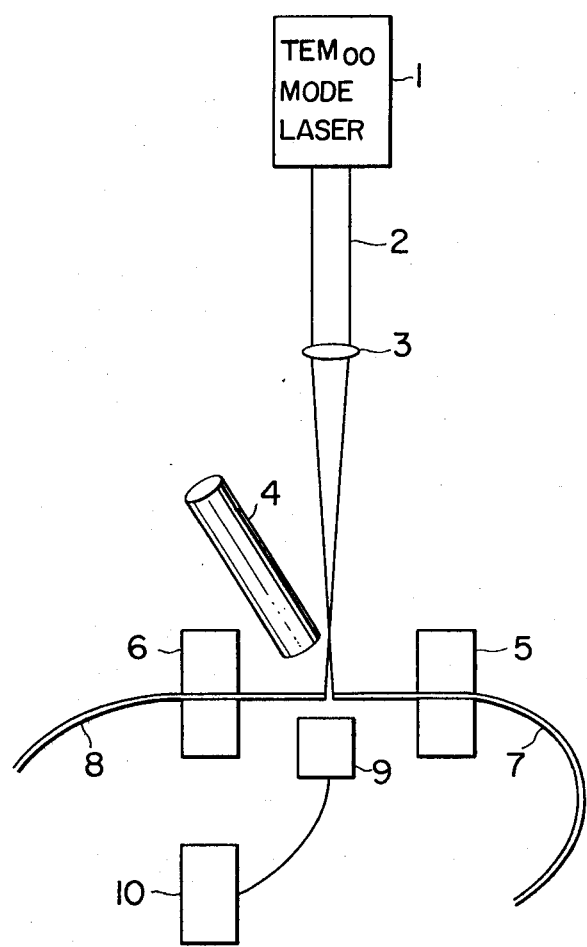
FIG. 4 shows schematically an exemplary embodiment of a method of joining optical fibers through fusion by means of a $CO_2$ laser.

In FIG. 4, reference numeral 1 denotes a $CO_2$ laser which produces a laser beam 2 focussed through a lens system 3. Numeral 4 denotes an observing microscope, 5 and 6 designate carriages for fine movement in the X-Y-Z coordinate (hereinafter referred to as micromanipulator), 7 and 8 are optical fibers to be joined together through fusion, 9 a photo-diode, and 10 denotes a power meter.

In operation of the arrangement shown in FIG. 4, the laser beam 2 emitted by the $CO_2$ laser 1 is focussed by the lens 3. The optical fibers 7 and 8 are aligned to each other in the vicinity of the focal point of the lens 3 (Ge or ZnSe lens) with the aid of X-Y-Z micromanipulators 5 and 6 under observation through the microscope 4, so that the opposite ends of the aligned fibers may be irradiated with the focussed laser beam to be fused together. The output from the $CO_2$ laser device 1 can be monitored by the photo-diode 9 and the power meter 10.

The $CO_2$ laser 1 is capable of producing continuous wave with $TEM_{oo}$ mode at maximum output power of 50 watts which can be continuously varied in the range of 0.3 watts to 50 watts. The lens 3 is a ZnSe lens of 5 inches in focal length. The position of the beam waist as well as the radius thereof may be measured and determined by a so-called knife edge technique. The position of the beam waist may be selected at 11.8 cm as measured from the lens 3, while the radius of the beam may be selected at 144 $\mu$m. From the estimation illustrated in FIG. 2, the laser power density required for the fusion in combination with the irradiation time of greater than 1 seconds is about 810 w/cm$^2$. Therefore, when the optical fibers are positioned at the beam waist, the laser power P required for fusion should be at least about 0.5 W from $$P \approx 810 W/cm^2 \times = \times (1.44 \times 10^{-2} cm)^2 \approx 0.5 W$$

In an example as carried out, the optical fibers are positioned at the waist portion of the laser beam and irradiated with the laser output of 0.5 to 1.0 W for duration of 1 to 5 seconds, which results in a satisfactory joint. It has been found that the laser output of 0.5 to 0.8 watts is suited for forming the fused joint or splice having an improved configuration and a low loss. At the laser output lower than 0.4 watts, a good joint or splice is not produced. On the other hand, the laser power of greater than 1.0 watts will result in deterioration of the quality of fiber such as discoloration into gray or evaporation of fiber substance, although the joint is formed. Accordingly, the laser power as well as the irradiation time required for forming the splice in the fused optical fiber should be determined on the basis of the values estimated from the mathematical expressions described hereinbefore.

The optical fibers are adjusted in one or two directions (See FIGS. 4 and 6a, respectively) by using the micro-manipulators 5 and 6 under the observation through the microscope 4 so that the cladding diameters may coincide with each other. In case the core or axis of the glass fiber and the cladding portion thereof are not concentric with each other, the alignment of the optical fibers should be carried out by passing a laser beam, preferably He-Ne laser through the aligned optical fibers such that the maximum joint efficiency can be attained.

The optical fibers to be spliced should not have the end faces formed with undulations or slanted end faces. However, it is difficult in practice to obtain the ideal end face. In such case, the glass fibers irradiated with the laser beam should be longitudinally fed relative to each other for about several to several ten microns by means of the micromanipulators during the fusing process.

Figure 5:
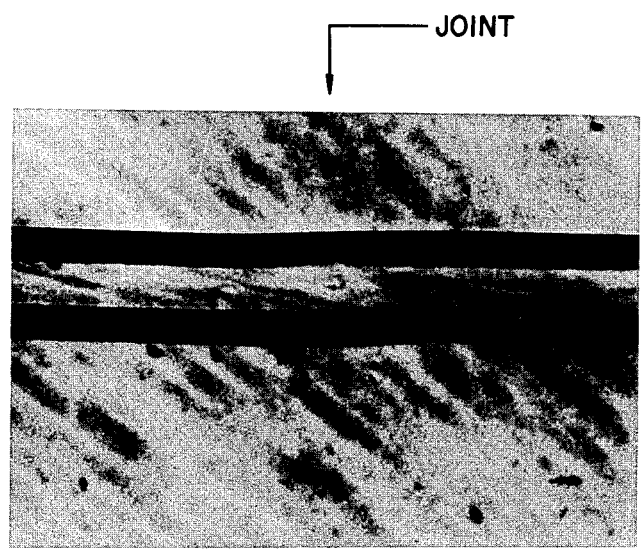
FIG. 5 is an enlarged view of a joint portion of optical fibers.

FIG. 5 shows a fused joint of an optical fiber in an enlarged view. The joint is formed with the core and the cladding retaining their original forms.

The transfer loss at the joint formed in the above manner is found lower than 0.5 dB as measured by the laser beam of 6328 Å emitted from a He - Ne laser device. Further, the tensile strength at the joint is as strong as that of the fiber itself.

Figure 6A:
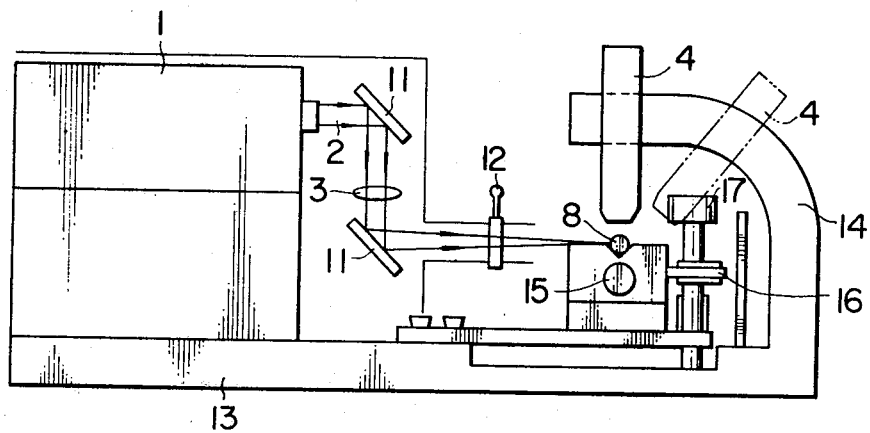
FIGS. 6a and 6b schematically show an exemplary arrangement of an optical fiber joining apparatus.
Figure 6B:
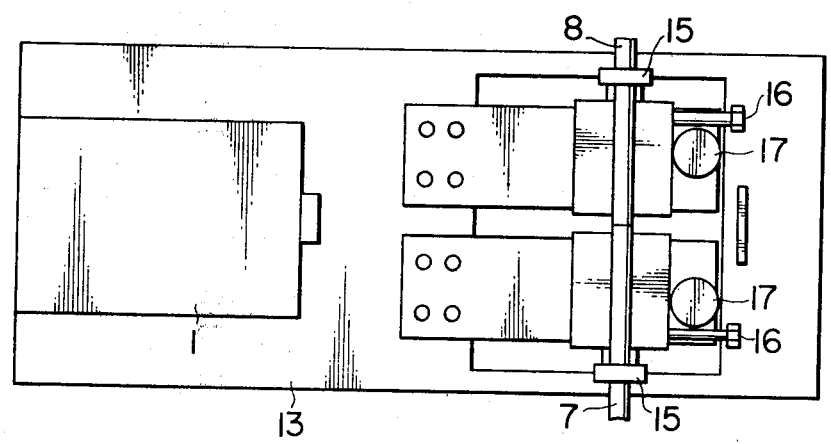

FIGS. 6a and 6b show in a side and a plan view, respectively, a general arrangement of an apparatus employed for splicing the optical fibers through fusion. In the figures, the same reference numerals as those of FIG. 4 denote like parts. Numeral 11 denotes a reflector with an adjustable optical axis, 12 is a shutter, 13 a base and 14 designates a support for the microscope. Numerals 15, 16 and 17 denote adjusting knobs for the carriages for fine movement (manipulators) adapted to be guided along associated V-like grooves. The numeral 11 indicates a reflector with an adjustable optical axis which serves to match the position of the waist portion of the laser beam with a marker position of the microscope.

Figure 7A:
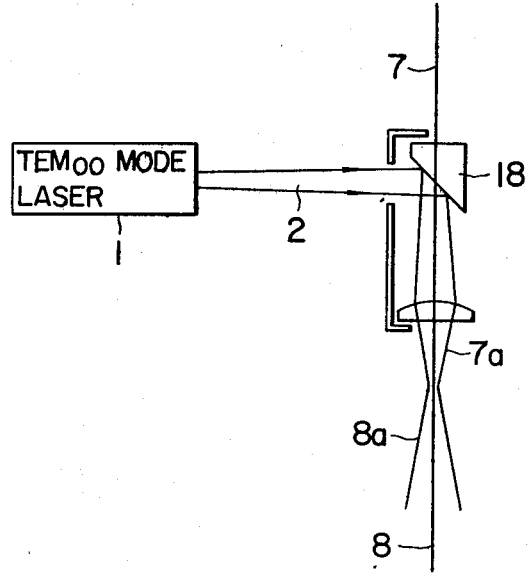
FIGS. 7a and 7b show an arrangement in which the portions of optical fibers to be joined are irradiated by laser beam over the whole peripheral surface.

FIG. 7a shows an arrangement in which the joined portions of the optical fibers 7 and 8 are irradiated around the whole peripheral portions by the laser beam 2 emitted from the laser oscillator 1 through a mirror 18 and a focussing lens 19. It is to be noted that axially expending slits are formed in the lens and the mirror, respectively, so as to facilitate the removal of the joined optical fibers.

Figure 7B:
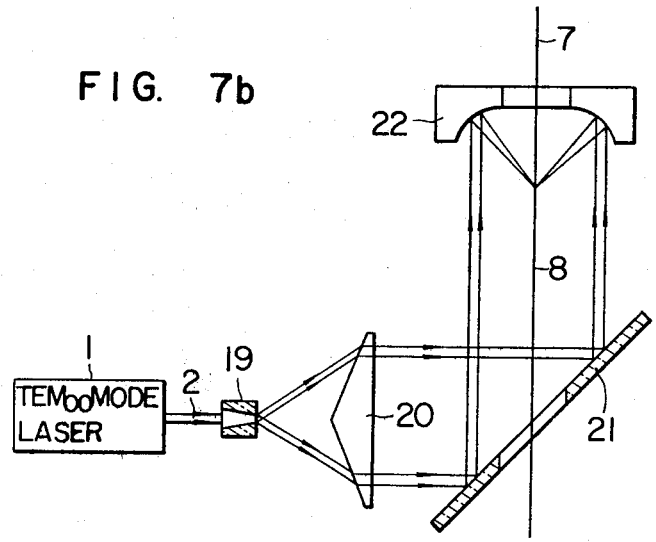

FIG. 7b shows another arrangement for irradiating the whole peripheral portions of the optical fibers to be joined. The laser beam 2 emitted from the laser oscillator 1 is converted into a cylindrical beam through a conical mirror or reflector 19, a conical lens 20. The cylindrical laser beam is applied to the spliced portions 7a and 8a around the whole circumferential surfaces thereof through a reflector mirror 21 and a focussing mirror 22 which are also provided with respective slits for axially positioning the optical fibers.

Figure 8:
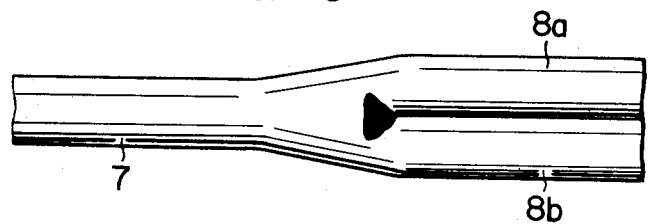
FIG. 8 shows a wave splitting coupler constructed by joining together optical fibers through fusion.
Figure 9A:
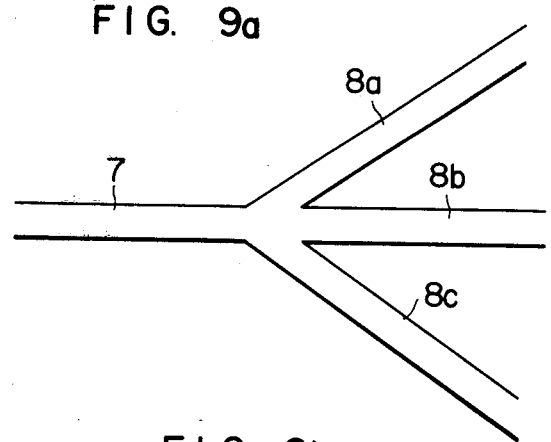
FIGS. 9a and 9c show other arrangements of wave splitting couplers composed of joined optical fibers.
Figure 9B:
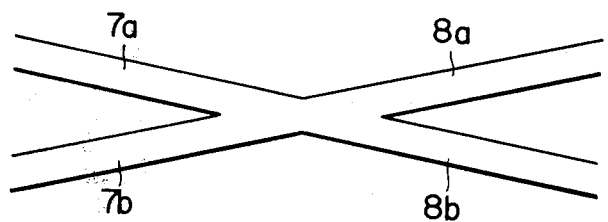
Figure 9C:
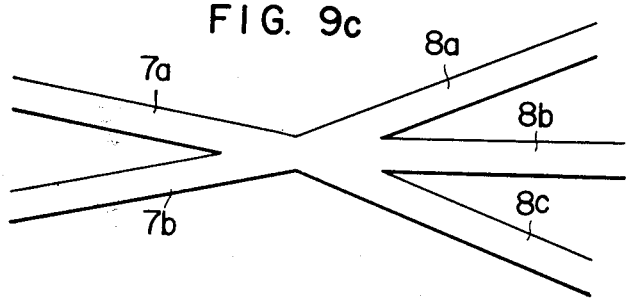

FIG. 8 shows a joined optical fiber formed of three optical fiber elements, i.e. two optical fibers are joined to one optical fiber in accordance with the teaching of the invention. Such joined structure of optical fibers provides a wave splitting coupler. Other types of joints which serve as multi-wave splitting coupler are shown in FIGS. 9a to 9c. In FIG. 9a, three optical fibers 8a, 8b and 8c are joined to a single optical fiber 7. In FIG. 9b, pairs of optical fibers 7a:7b and 8a:8b are joined together. In the case of FIG. 9b, two optical fibers 7a and 7b are concurrently joined to three optical fibers 8a, 8b and 8c.

As will be appreciated from the foregoing description, the method of joining optical fibers by using a $CO_2$ laser in accordance with the invention has an advantage that the fused quartz or silica fibers having a high softening point can be fused together, which is impossible in the case of the conventional method using a heated nichrome wire. Further, by vitue of the fact that the heat flux required for the fusion can be easily controlled, joint having an improved reproductivity and a reduced joint loss can be accomplished. Besides, deposition of impurities can be effectively excluded.

In the above mentioned embodiments of the present invention, the fiber to be joined together was limitted to a fused silica or fused quartz fiber. However, other glass fibers containing multiple ingredients may be applicable since a $CO_2$ laser beam is also absorbed in these glass fibers so that they are fused and joined together.

What we claim is:

1. Method of joining together at least two optical fibers of fused silica having a diameter of no more than 300 microns, the method comprising the steps of:
   placing the optical fibers in alignment such that end surfaces of each of the optical fibers are opposed in spaced relation at a distance which enables a contact of the end faces upon a thermal expansion of the optical fibers, and
   irradiating the optical fibers at the end faces by a focussed laser beam from a $CO_2$-laser having a power output of no more than 2 watts for no more than 20 seconds, to thermally expand the end faces into contact and fuse the end faces together, the focussed laser beam having a diameter larger tha that of the optical fibers.

2. Method according to claim 1, wherein the step of irradiating includes irradiating an entire peripheral surface portion of the optical fibers at the end faces in a direction substantially perpendicular to an axis of the optical fibers.

3. Method according to claim 1, further comprising the step of moving the end faces relatively together during the step of irradiating.

4. A method of joining together at least two optical fibers of fused silica having a diameter of no more than 300 microns, the method comprising the steps of:
   placing at least two of said optical fibers in alignment such that the end faces of each of the two optical fibers are opposed and in contact with each other, and
   irradiating the optical fibers at the end faces by a focussed laser beam in a direction perpendicular to an axis of two axially-aligned fibers from a $CO_2$-laser having a power output of no more than 2 watts for a predetermined period of seconds, said focussed laser beam having a diameter larger than that of the optical fibers and being in the range of about 300 to 400 microns.

5. A method according to claim 4, wherein during the step of irradiating the optical fibers, said end faces of each of the optical fibers are pressed against each other.

6. A method according to claim 4, including the step of receiving output power of said $CO_2$-laser through the optical fibers to be joined by a photoelectric converting element to display said power output in a power meter, whereby joining of said optical fibers is attained while monitoring the output of said $CO_2$-laser.

7. A method according to claim 4, wherein said $CO_2$-laser operates in $TEM_{oo}$ mode.

8. A method according to claim 4, wherein said laser beam has a focussed waist portion for irradiating said joined portions, said focussed waist portion being adjusted to match a marker position of an observation microscope, and wherein said joined portions are located in position by said marker position.

9. A method according to claim 4, wherein said predetermined period is from 1 to 5 seconds.

10. A method of joining together at least two optical fibers of fused silica having a diameter of no more than 300 microns, comprising the steps of:
    abutting end surfaces of two optical fibers in an axial alignment,
    arranging a focussed laser beam perpendicular to an axis of the aligned fibers,
    irradiating said end faces by a focussed laser beam from a $CO_2$-laser having a power output of no more than 2 watts, said focussed laser beam having a diameter larger than that of the optical fibers being in the range of 300 to 400 microns, and having a laser power density of at least 810 watts/cm$^2$.

11. A method according to claim 10, wherein during irradiating said aligned end faces are pressed against each other.

12. A method according to claim 10, including the additional step of receiving output power of said laser beam through the end surface of the optical fibers by a photoelectric converting element to display said output power in a power meter, whereby joining of said optical fibers is attained while monitoring said output power of said laser beam.

13. A method according to claim 10, wherein said irradiating takes place for about 1 to 5 seconds.

14. A method according to claim 10 or 11, wherein said focussed laser beam has a power output from about 0.4 watts to about 1.0 watt.

* * * * *